United States Patent
Shiiyama (10) Patent No.: US 7,246,249 B2
(45) Date of Patent: Jul. 17, 2007

(54) REPRODUCTION CONTROL OF REPRODUCTION APPARATUS BASED ON REMAINING POWER OF BATTERY

(75) Inventor: Hirotaka Shiiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 10/454,206

(22) Filed: Jun. 4, 2003

(65) Prior Publication Data
US 2004/0021974 A1 Feb. 5, 2004

(30) Foreign Application Priority Data
Jun. 10, 2002 (JP) .............................. 2002/168808
Jun. 10, 2002 (JP) .............................. 2002/168809

(51) Int. Cl.
*G06F 1/26* (2006.01)
(52) U.S. Cl. ...................... 713/320; 713/300; 358/400
(58) Field of Classification Search ................ 713/300, 713/320; 455/435, 572; 348/553; 381/74; 307/72; 358/400
See application file for complete search history.

(56) References Cited

U.S. PATENT DOCUMENTS

| | | | |
|---|---|---|---|
| 6,278,202 B1 * | 8/2001 | Sakagawa et al. ............ 307/72 |
| 6,363,266 B1 * | 3/2002 | Nonogaki .................... 455/572 |
| 6,947,181 B1 * | 9/2005 | Sato ........................... 358/400 |
| 2001/0027102 A1 * | 10/2001 | Okazaki et al. ............. 455/435 |
| 2002/0039424 A1 * | 4/2002 | Watanuki ..................... 381/74 |
| 2002/0051081 A1 * | 5/2002 | Hori et al. .................. 348/553 |
| 2002/0057769 A1 | 5/2002 | Bhatoolaul et al. | |

FOREIGN PATENT DOCUMENTS

| | | |
|---|---|---|
| JP | 2000-235637 | 8/2000 |
| JP | 2000-235638 | 8/2000 |

* cited by examiner

*Primary Examiner*—Chun Cao
*Assistant Examiner*—Sean Weinman
(74) *Attorney, Agent, or Firm*—Cowan, Liebowitz & Latman, P.C.

(57) ABSTRACT

A reproduction apparatus and method for reproducing selected digital data reproduces digital data selected by a user, detects remaining power of a battery, and determines whether the selected digital data can be reproduced to the end or not based on the detected remaining power. Before the selected digital data is reproduced, if it is determined that there is sufficient battery power to reproduce the selected digital data to the end, then the selected digital data is reproduced. If not, a warning is provided and the user selects either a first reproduction mode or a second reproduction mode. If the first reproduction mode is selected, the selected digital data is reproduced. If the second reproduction mode is selected, summary data that includes a summary of the selected digital data is reproduced.

6 Claims, 6 Drawing Sheets

REPRODUCTION CONTROL OF REPRODUCTION APPARATUS BASED ON REMAINING POWER OF BATTERY

FIELD OF THE INVENTION

The present invention relates to an apparatus for reproducing digital data such as video data and audio data, and more particularly, to a reproduction apparatus that carries out reproduction processing in consideration of remaining power of a battery.

BACKGROUND OF THE INVENTION

Portable devices such as a portable video player, portable audio player, notebook PC and PDA (Personal Digital Assistant) are driven by a battery and have the function of reproducing digital data such as video data and audio data.

However, conventional portable devices cannot carry out reproduction processing in consideration of remaining power of a battery. Thus, the conventional portable devices cannot decide before reproducing desired digital data whether the digital data can be reproduced to the end or not.

SUMMARY OF THE INVENTION

The present invention has been made in consideration of the above situation, and has as its object to implement reproduction processing in consideration of the remaining power of the battery.

According to the present invention, the foregoing object is attained by providing a reproduction apparatus comprising: a prediction unit that predicts a reproducible time based on remaining power of a battery; and a decision unit that decides whether digital data selected by a user can be reproduced to the end or not based on the reproducible time, wherein when the digital data cannot be reproduced to the end, an alarm is issued indicating that the digital data cannot be reproduced to the end.

According to the present invention, the foregoing object is also attained by providing a control method comprising: predicting a reproducible time based on remaining power of a battery; deciding whether digital data selected by a user can be reproduced to the end or not based on the reproducible time; and warning when the digital data cannot be reproduced to the end that the digital data cannot be reproduced to the end.

Further, the foregoing object is also attained by providing a reproduction apparatus comprising: a detection unit that detects remaining power of a battery; and a decision unit that decides whether digital data selected by a user can be reproduced to the end or not based on the remaining power of the battery, wherein when the digital data cannot be reproduced to the end, an alarm is issued to indicate that the digital data cannot be reproduced to the end.

Furthermore, the foregoing object is also attained by providing a control method comprising: detecting remaining power of a battery; deciding whether digital data selected by a user can be reproduced to the end or not based on the remaining power of the battery; warning when the digital data cannot be reproduced to the end that the digital data cannot be reproduced to the end.

Still further, the foregoing object is attached by providing a reproduction apparatus comprising: a reproduction unit that reproduces digital data selected by a user; a detection unit that detects remaining power of a battery; and a determination unit that determines whether the selected digital data can be reproduced to the end or not based on the remaining power detected by the detection unit, before the reproduction unit starts reproducing the selected digital data, wherein if it is determined by the determination unit that the selected digital data can be reproduced to the end, the reproduction apparatus causes the reproduction unit to reproduce the selected digital data, and wherein if it is determined by the determination unit that the selected digital data cannot be reproduced to the end, the reproduction apparatus warns that the selected digital data cannot be reproduced to the end and causes the user to select one of first and second reproduction modes, if the first reproduction mode is selected by the user, the reproduction apparatus causes the reproduction unit to reproduce the selected digital data, and if the second reproduction mode is selected by the user, the reproduction apparatus causes the reproduction unit to reproduce summary data including a summary of the selected digital data.

The foregoing object is also attained by a method for controlling a reproduction apparatus having a reproduction unit that reproduces digital data selected by a user, the method comprising the steps of: detecting remaining power of a battery; determining whether the selected digital data can be reproduced to the end or not based on the remaining power detected in the detecting step, before the reproduction unit starts reproducing the selected digital data; if it is determined in the determining step that the selected digital data can be reproduced to the end, causing the reproduction unit to reproduce the selected digital data; if it is determined in the determining step that the selected digital data cannot be reproduced to the end, warning that the selected digital data cannot be reproduced to the end; if it is determined in the determining step that the selected digital data cannot be reproduced to the end, causing the user to select one of first and second reproduction modes; if the first reproduction mode is selected by the user, causing the reproduction unit to reproduce the selected digital data; and if the second reproduction mode is selected by the user, causing the reproduction unit to reproduce summary data including a summary of the selected digital data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
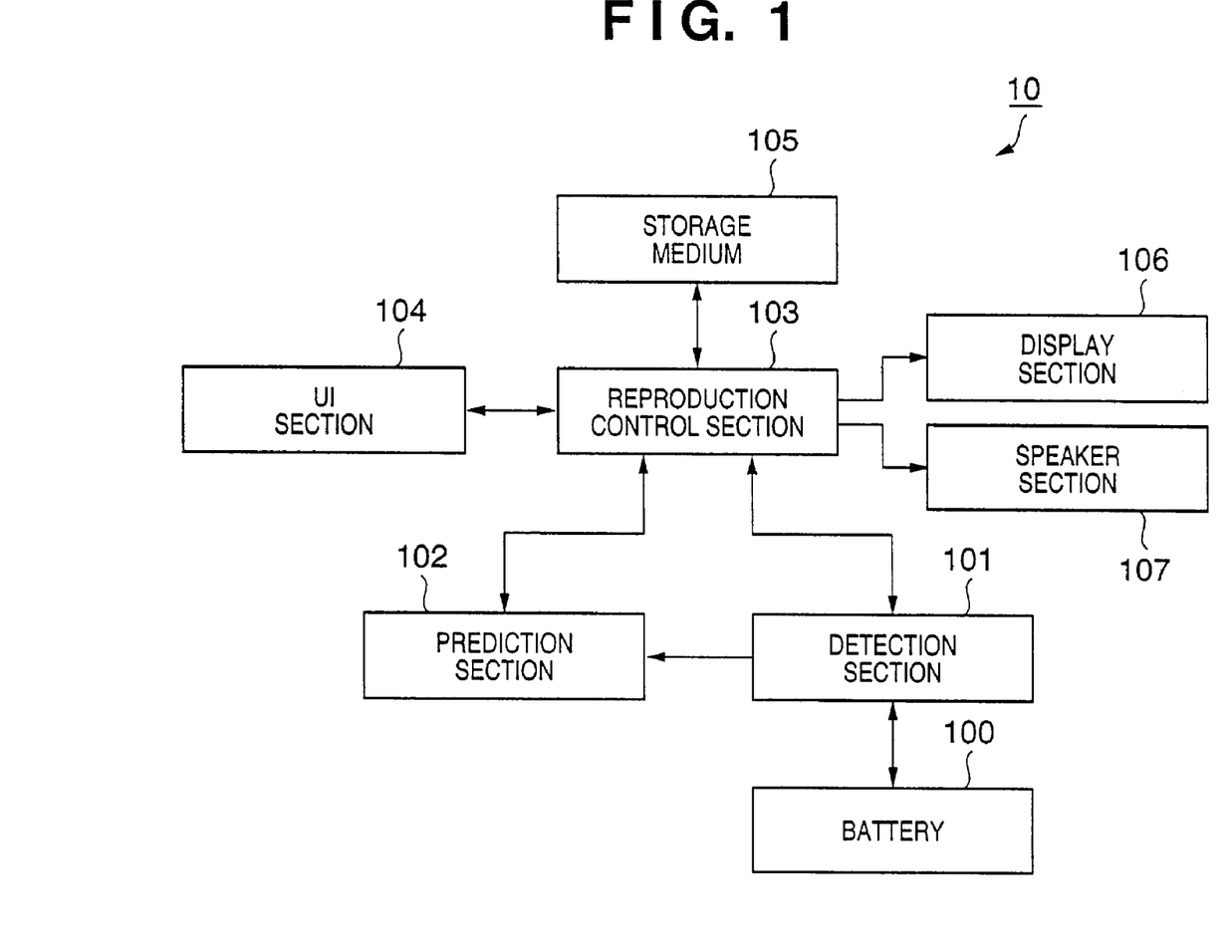
FIG. 1 is a block diagram showing a configuration example of a reproduction apparatus according to first and second embodiments.
Figure 2:
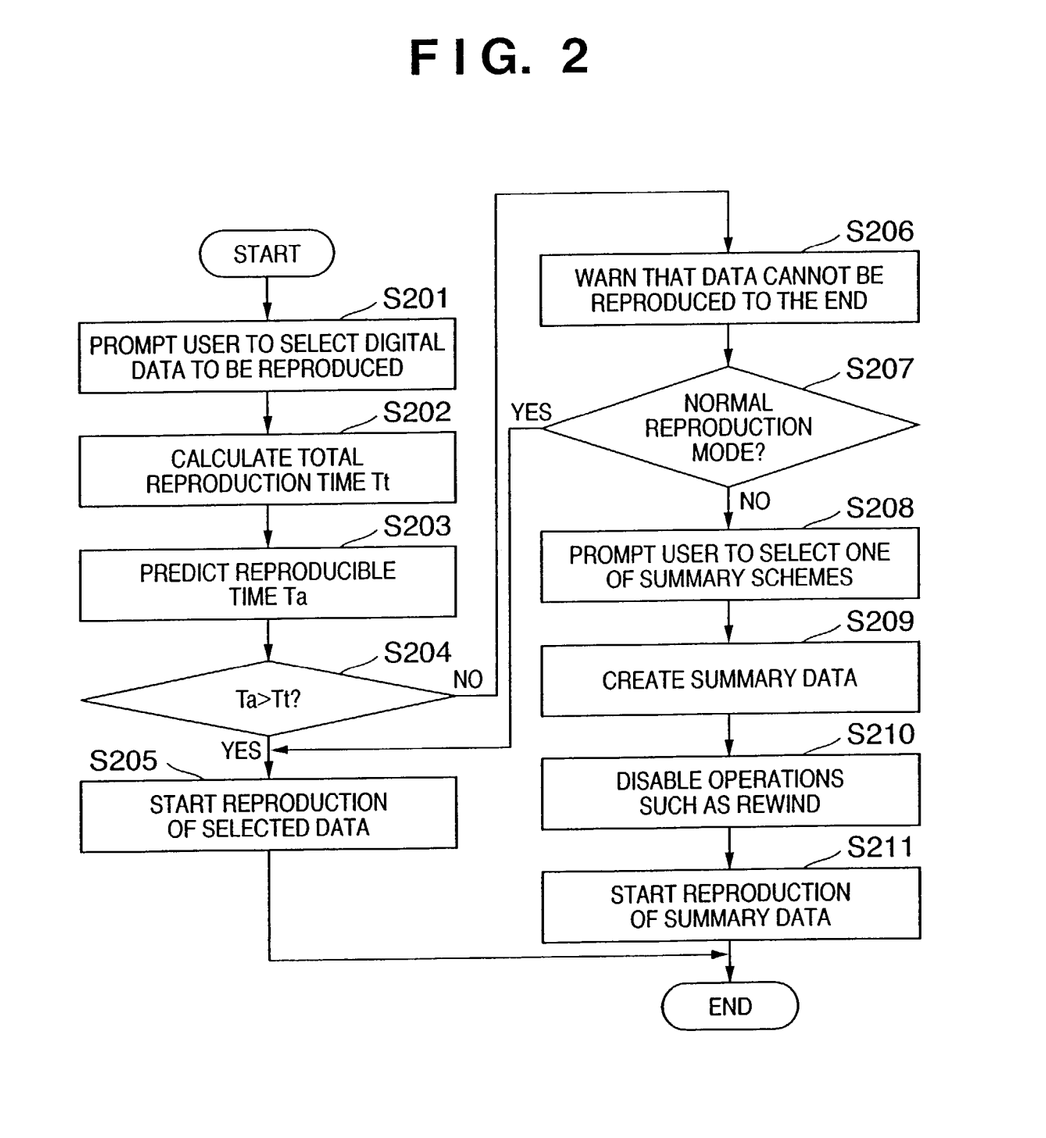
FIG. 2 is a flow chart showing a processing procedure of the reproduction apparatus according to the first embodiment.

With reference to FIG. 1 and FIG. 2, a first embodiment of the present invention will be explained in detail below.

First, with reference to the block diagram in FIG. 1, a configuration example of a reproduction apparatus 10 according to a first embodiment will be explained. The reproduction apparatus 10 shown in FIG. 1 is a portable device that is driven by a battery 100 and has the function of reproducing digital data stored in a storage medium 105. The digital data that the reproduction apparatus 10 reproduces from the storage medium 105 may be video data, audio data, or video data with audio data.

As shown in FIG. 1, the reproduction apparatus 10 includes the battery 100, a detection section 101, a prediction section 102, a reproduction control section 103, a UI section 104, a storage medium 105, a display section 106 and a speaker section 107.

The detection section 101 has the function of detecting the remaining power of the battery 100. The prediction section 102 has the function of predicting an reproducible time using the remaining power of the battery 100. The reproduction control section 103 has the function of reproducing the digital data selected by the user from the storage medium 105. The user interface section (UI section) 104 has the function of notifying the reproduction control section 103 of the user's instructions. The display section 106 displays video data in the digital data reproduced from the storage medium 105. The speaker section 107 outputs the audio data in the digital data reproduced from the storage medium 105.

Next, the processing procedure of the reproduction apparatus 10 according to the first embodiment will be explained with reference to the flow chart in FIG. 2.

In step S201, the UI section 104 prompts the user to select digital data to be reproduced.

In step S202, the reproduction control section 103 calculates a total reproduction time Tt which is a time required to reproduce all the digital data selected by the user (hereinafter referred to as "selected data").

In step S203, the reproduction control section 103 makes the detection section 101 detect the current remaining power of the battery 100 and makes the prediction section 102 predict the current reproducible time Ta. At this time, the detection section 101 detects the current remaining power of the battery 100 and notifies it to the prediction section 102. In turn, the prediction section 102 predicts the current reproducible time Ta using the current remaining power of the battery 100 and notifies it to the reproduction control section 103.

In step S204, the reproduction control section 103 decides whether the current reproducible time Ta is longer than the total reproduction time Tt or not. This decision corresponds to a decision as to whether the selected data can be reproduced to the end or not.

When the current reproducible time Ta is longer than the total reproduction time Tt (YES in step S204), the selected data can be reproduced to the end. In this case, the process moves on to step S205 and the reproduction control section 103 starts reproduction of the selected data without creating any summary of the selected data.

On the other hand, if the current reproducible time Ta is not longer than the total reproduction time Tt (NO in step S204), the battery 100 will be exhausted during reproduction of the selected data, and therefore the selected data will not be reproduced to the end. In this case, the process moves on to step S206 and the reproduction control section 103 displays a message or icon on the display section 106 indicating that the selected data cannot be reproduced to the end and warns the user of it. At this time, the reproduction control section 103 can also display the total reproduction time Tt, reproducible time Ta and their difference on the display section 106.

In step S207, the UI section 104 prompts the user to select a normal reproduction mode or summary reproduction mode. When the user selects the normal reproduction mode, the process in step S205 is executed. On the other hand, if the user selects the summary reproduction mode, the process in step S208 is executed.

In step S208, the UI section 104 prompts the user to select one of summary schemes.

In step S209, the reproduction control section 103 generates summary data which is a summary of the selected data based on the summary scheme selected by the user. At this time, the reproduction control section 103 makes sure that the total reproduction time of the summary data is shorter than a current reproducible time Ta. It should be noted that if the time taken to generate the summary is long, the remaining power of the battery 100 may reduce drastically causing the reproducible time to be shortened. Thus, upon creating summary data the reproduction apparatus 10 according to the first embodiment re-predicts a reproducible time at predetermined intervals and compares it with the total reproduction time.

After the reproduction of the summary data is started, operations such as fast rewind, fast forward and pause may reduce the remaining power of the battery 100 drastically, causing the battery 100 to be exhausted during the reproduction of the summary data. Therefore, the UI section 104 starts the reproduction of the summary and then disables operations other than stop (fast rewind, fast forward, pause, etc.) in step S210. This function prevents the reproduction of the summary data from being interrupted midway.

In step S211, the reproduction control section 103 starts to reproduce the summary data. If video data is found in the summary data, the reproduction control section 103 processes it and supplies it to the display section 106 and if audio data is found in the summary data, the reproduction control section 103 processes it and supplies it to the speaker section 107.

As described above, the reproduction apparatus 10 according to the first embodiment can perform reproduction processing in consideration of the remaining power of the battery 100. Furthermore, when the remaining power of the battery 100 is too small to reproduce the digital data selected by the user to the end, the reproduction apparatus 10 according to the first embodiment can warn the user of it.

Next, the summary scheme that can be selected in step S208 will be explained.

(1) Summary Scheme 1

In this scheme, the reproduction control section 103 automatically generates summary data of the selected data.

(2) Summary Scheme 2

This scheme allows the user to select portions to be reproduced and gathers the portions selected by the user to generate summary data of the selected data.

(3) Summary System 3

In this scheme, the reproduction control section 103 automatically generates summary data of the selected data based on user preference information which is information on the user's preferences. As the user's preference information, it is possible to use information specified by the MPEG-7 standard.

(4) Summary System 4

This scheme allows the user to select portions to be reproduced from among portions automatically selected by the reproduction control section 103 based on the user's preference information and gathers the portions selected by the user to generate summary data of the selected data.

Second Embodiment

Figure 3:
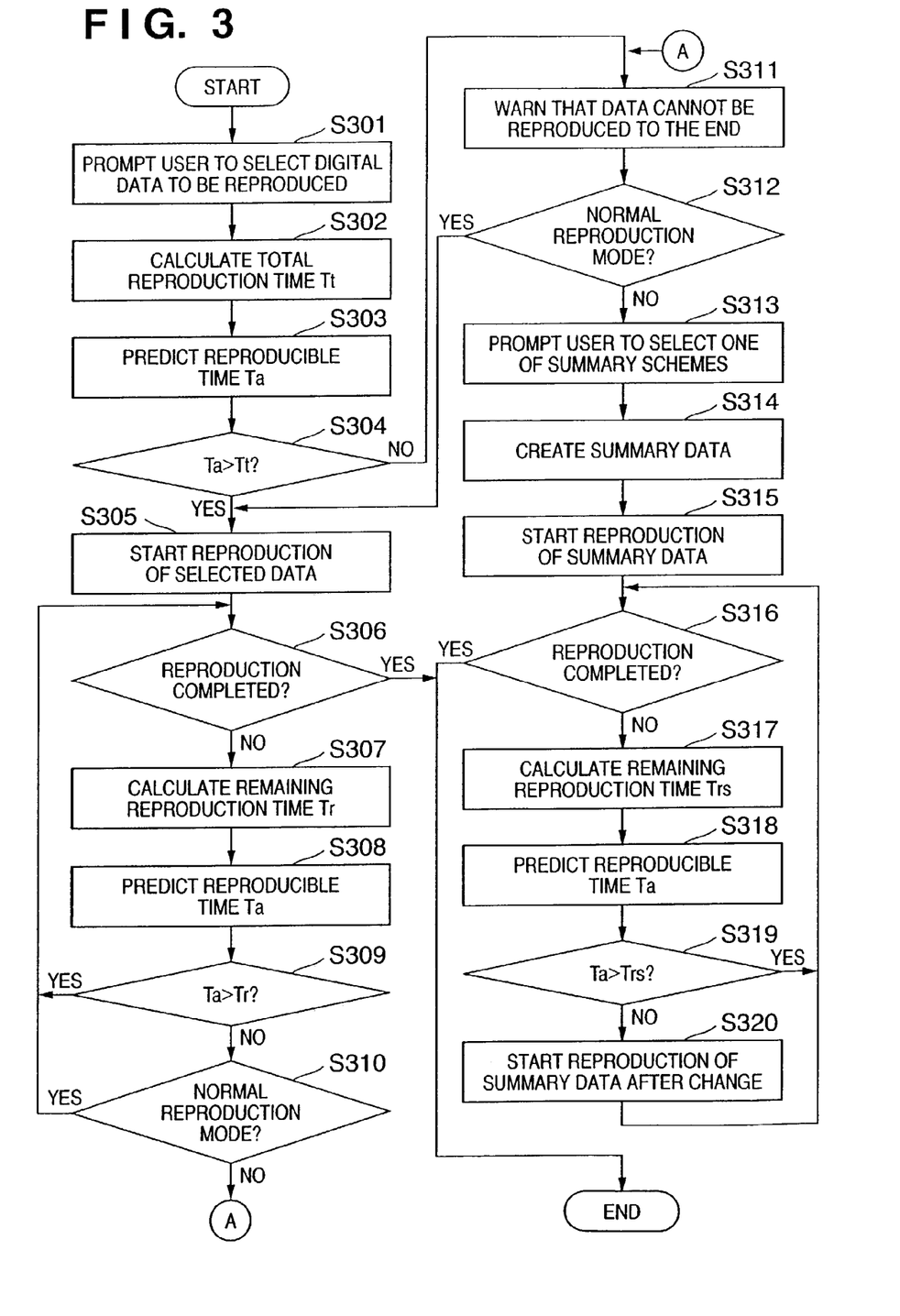
FIG. 3 is a flow chart showing a processing procedure of the reproduction apparatus according to the second embodiment.

With reference to FIG. 1 and FIG. 3, a second embodiment of the present invention will be explained in detail below.

With reference to the flow chart in FIG. 3, a processing procedure of the reproduction apparatus 10 according to the second embodiment will be explained.

In step S301, the UT section 104 prompts the user to select digital data to be reproduced.

In step S302, the reproduction control section 103 calculates a total reproduction time Tt, which is a time necessary to reproduce all digital data selected by the user (hereinafter referred to as "selected data").

In step S303, the reproduction control section 103 makes the detection section 101 detect the current remaining power of the battery 100 and makes the prediction section 102 predict the current reproducible time Ta. At this time, the detection section 101 detects the current remaining power of the battery 100 and notifies it to the prediction section 102. In turn, the prediction section 102 predicts the current reproducible time Ta using the current remaining power of the battery 100 and notifies it to the reproduction control section 103.

In step S304, the reproduction control section 103 decides whether the current reproducible time Ta is longer than the total reproduction time Tt or not. This decision corresponds to a decision as to whether the selected data can be reproduced to the end or not.

When the current reproducible time Ta is longer than the total reproduction time Tt (YES in step S304), the selected data can be reproduced to the end. In this case, the process moves on to step S305 and the reproduction control section 103 starts reproduction of the selected data without creating any summary of the selected data.

In step S306, the reproduction control section 103 decides whether the reproduction of the selected data is completed or not.

If the reproduction of the selected data is not completed (NO in step S306), in step S307, the reproduction control section 103 calculates the remaining reproduction time Tr of the selected data.

In step S308, the reproduction control section 103 makes the detection section 101 redetect the current remaining power of the battery 100 and makes the prediction section 102 predict the current reproducible time Ta. At this time, the detection section 101 detects the current remaining power of the battery 100 and notifies it to the prediction section 102. In turn, the prediction section 102 predicts the current reproducible time Ta using the current remaining power of the battery 100 and notifies it to the reproduction control section 103.

In step S309, the reproduction control section 103 decides whether the current reproducible time Ta is longer than the remaining reproduction time Tr or not. This decision corresponds to a decision as to whether the selected data can be reproduced to the end or not. If the reproducible time Ta is longer than the remaining reproduction time Tr (YES in step S309), the process moves back to step S306 and the reproduction control section 103 continues to reproduce the selected data.

When the current reproducible time Ta is not longer than the reproduction time Tr (NO in step S309), the selected data cannot be reproduced to the end. In this case, the process moves on to step S310 and the reproduction control section 103 decides whether a normal reproduction mode is selected or not. If the normal reproduction mode is selected, the reproduction control section 103 continues to reproduce the selected data without generating any summary.

After the determination of step S304, when the current reproducible time Ta is not longer than the total reproduction time Tt (NO in step S304) or when the normal reproduction mode is not selected in step S310, the battery 100 will be exhausted during reproduction of the selected data, and therefore the selected data will not be reproduced to the end. In this case, the process moves on to step S311, the reproduction control section 103 displays a message or icon on the display section 106 indicating that the selected data cannot be reproduced to the end and warns the user of it. At this time, the reproduction control section 103 may also display the total reproduction time Tt, reproducible time Ta and their difference on the display section 106.

In step S312, the UI section 104 prompts the user to select a normal reproduction mode or summary reproduction mode. When the user selects the normal reproduction mode, the process in step S305 is executed. On the other hand, if the user selects the summary reproduction mode, the process in step S313 is executed.

If the summary reproduction mode is selected, the UI section 104 prompts the user to select one of summary schemes in step S313. In step S313, for example, the summary scheme can be selected from the summary schemes 1 to 4 explained in the above-described first embodiment.

In step S314, the reproduction control section 103 generates summary data which is a summary of the selected data based on the summary scheme selected by the user. At this time, the reproduction control section 103 makes sure that the total reproduction time of the summary data is shorter than the current reproducible time Ta. If the time taken to generate the summary is long, the remaining power of the battery 100 may reduce drastically causing the reproducible time to be shortened. Thus, upon creating summary data the reproduction apparatus 10 according to the second embodiment re-predicts a reproducible time at predetermined intervals and compares it with the total reproduction time.

In step S315, the reproduction control section 103 starts to reproduce the summary data. Unlike the reproduction apparatus 10 according to the first embodiment, the reproduction apparatus 10 according to the second embodiment does not restrict operations such as fast rewind, fast forward, pause except a stop operation after the reproduction of the summary data is started. Therefore, if these operations are performed during reproduction, the remaining power of the battery may be too small to reproduce all summary data. Operations in and after step S316 will be carried out to handle such a case.

In step S316, the reproduction control section 103 decides whether the reproduction of the summary data is completed or not.

If the reproduction of the summary data is not completed (NO in step S316), the process moves on to step S317 and the reproduction control section 103 calculates a remaining reproduction time Trs of the remaining summary data.

In step S318, the reproduction control section 103 makes the detection section 101 detect the current remaining power of the battery 100 and makes the prediction section 102 predict the current reproducible time Ta. At this time, the detection section 101 detects the current remaining power of the battery 100 and notifies it to the prediction section 102. In turn, the prediction section 102 predicts the current reproducible time Ta using the current remaining power of the battery 100 and notifies it to the reproduction control section 103.

In step S319, the reproduction control section 103 decides whether the reproducible time Ta is longer than the remaining reproduction time Trs or not. This decision corresponds to a decision as to whether the summary data can be reproduced to the end or not. When the reproducible time Ta is longer than the remaining reproduction time Trs (YES in step S319), the process moves back to step S316 and the reproduction control section 103 continues to reproduce the summary data.

When the reproducible time Ta is not longer than the remaining reproduction time Trs (NO in step S319), the summary data cannot be reproduced to the end. In this case, the process moves on to step S320 and the reproduction control section 103 changes the content of the summary data. Then, after changing the content of the summary data, the reproduction control section 103 starts to reproduce the changed summary data. If video data is found in the summary data, the reproduction control section 103 processes it and supplies it to the display section 106 and if audio data is found in the summary data, the reproduction control section 103 processes it and supplies it to the speaker section 107.

As described above, the reproduction apparatus 10 according to the second embodiment can perform reproduction processing in consideration of the remaining power of the battery 100. Furthermore, when the remaining power of the battery 100 is too small to reproduce the digital data selected by the user to the end, the reproduction apparatus 10 according to the second embodiment can warn the user of it. Furthermore, the reproduction apparatus 10 according to the second embodiment need not restrict operations such as fast rewind, fast forward, pause even in a summary reproduction mode.

Third Embodiment

Figure 4:
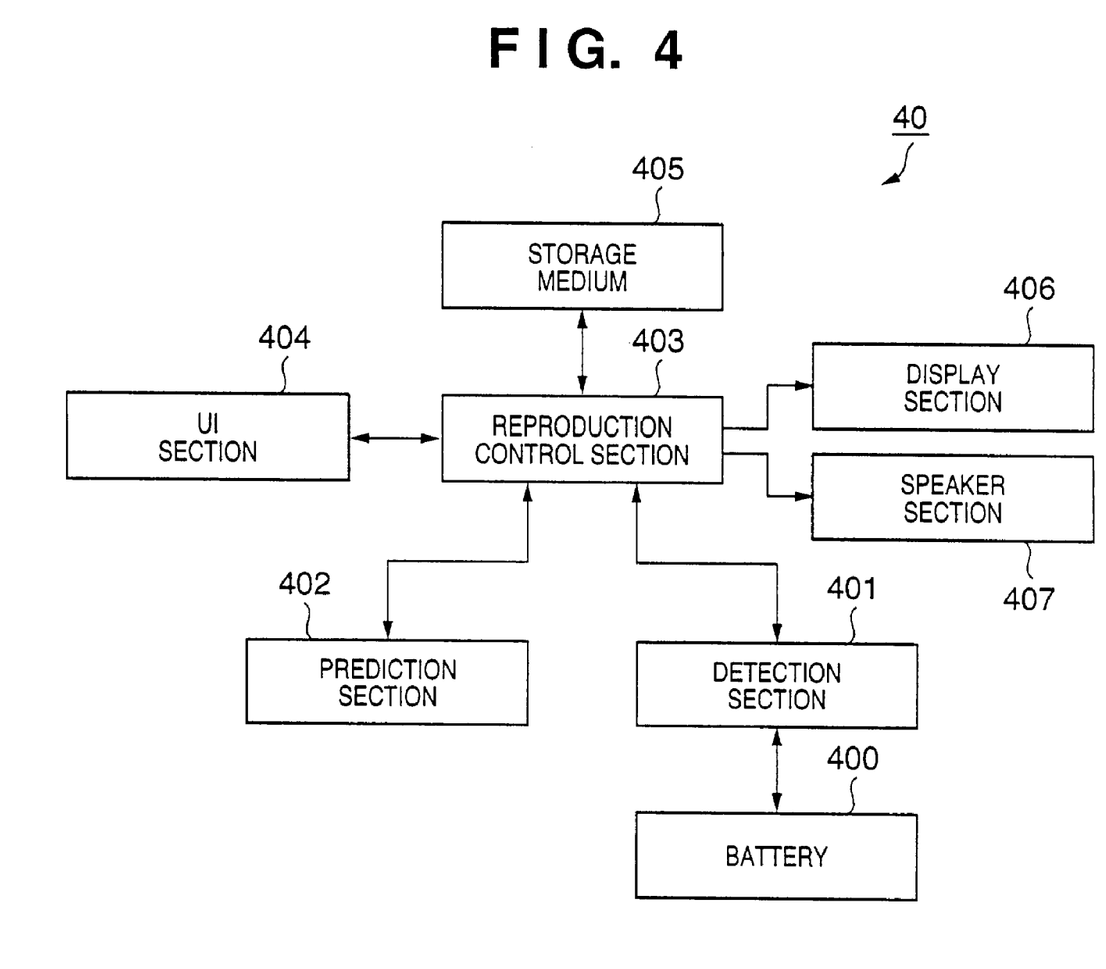
FIG. 4 is a block diagram showing a configuration example of a reproduction apparatus according to third and fourth embodiments.
Figure 5:
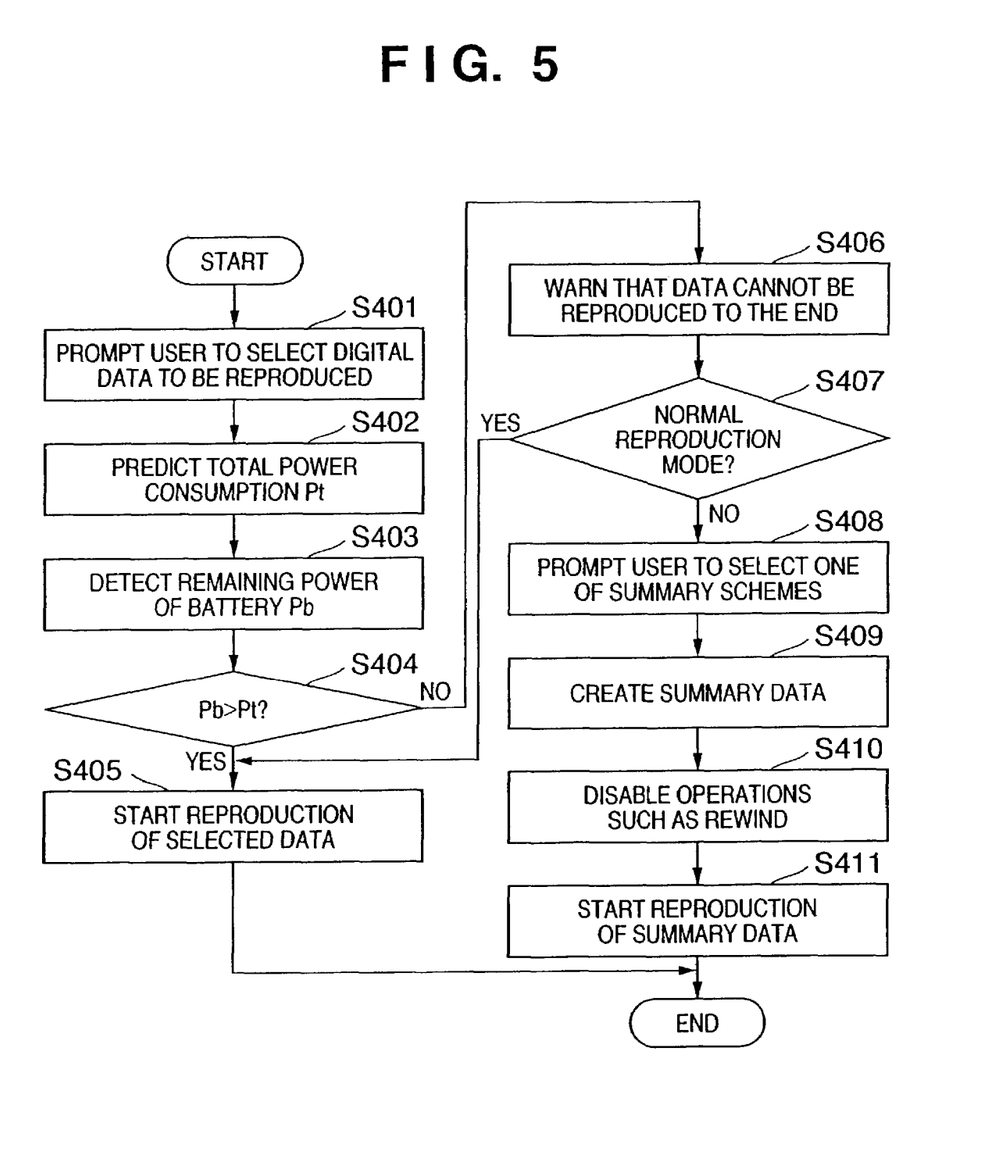
FIG. 5 is a flow chart showing a processing procedure of the reproduction apparatus according to the third embodiment of the present invention.

With reference to FIG. 4 and FIG. 5, a third embodiment of the present invention will be explained in detail below.

First, with reference to the block diagram in FIG. 4, a configuration example of a reproduction apparatus 40, according to a third embodiment will be explained. The reproduction apparatus 4 shown in FIG. 4 is a portable device that is driven by a battery 400 and has the function of reproducing digital data stored in a storage medium 405. The digital data that the reproduction apparatus 40 reproduces from the storage medium 405 may be video data, audio data, or video data with audio data.

As shown in FIG. 4, the reproduction apparatus 40 includes the battery 400, a detection section 401, a prediction section 402, a reproduction control section 403, a UI section 404, a storage medium 405, a display section 406 and a speaker section 407.

The detection section 401 has the function of detecting the remaining power of the battery 400. The prediction section 402 has the function of predicting an reproducible time using the remaining power of the battery 400. The reproduction control section 403 has the function of reproducing the digital data selected by the user from the storage medium 405. The user interface section (UI section) 404 has the function of notifying the reproduction control section 403 of the user's instructions. The display section 406 displays video data in the digital data reproduced from the storage medium 405. The speaker section 407 outputs the audio data in the digital data reproduced from the storage medium 405.

Next, the processing procedure of the reproduction apparatus 40 according to the third embodiment will be explained with reference to the flow chart in FIG. 5.

In step S401, the UI section 404 prompts the user to select digital data to be reproduced In step S402, the reproduction control section 403 makes the prediction section 402 to predict total power consumption Pt which is power consumption required to reproduce all the digital data selected by the user (hereinafter referred to as "selected data"). The prediction section 402 predicts the current total power consumption Pt and notifies it to the reproduction control section 403.

In step S403, the reproduction control section 403 makes the detection section 401 detect the current remaining power Pb of the battery 400. The detection section 401 detects the current remaining power Pb of the battery 400 and notifies it to the reproduction control section 403.

In step S404, the reproduction control section 403 decides whether the current remaining power Pb of the battery 400 is greater than the total power consumption Pt or not. This decision corresponds to a decision as to whether the selected data can be reproduced to the end or not.

When the current remaining power Pb of the battery 400 is greater than the total power consumption Pt (YES in step S404), the selected data can be reproduced to the end. In this case, the process moves on to step S405 and the reproduction control section 403 starts to reproduce the selected data without generating any summary of the selected data.

On the other hand, when the current remaining power Pb of the battery 400 is not greater than the total power consumption Pt (NO in step S404), the battery 400 will be exhausted during reproduction of the selected data and the selected data will not be reproduced to the end. In this case, the process moves on to step S406, the reproduction control section 403 displays a message or icon on the display section 406 indicating that the selected data cannot be reproduced to the end and warns the user of it. At this time, the reproduction control section 403 can also display the current remaining power Pb of the battery 400, total power consumption Pt and the difference thereof on the display section 406.

In step S407, the UI section 404 prompts the user to select a normal reproduction mode or summary reproduction mode. When the user selects the normal reproduction mode, the process in step S405 is executed. On the other hand, if the user selects the summary reproduction mode, the process in step S408 is executed.

In step S408, the UI section 404 prompts the user to select one of the summary schemes. In step S408, for example, the summary scheme can be selected from the summary schemes 1 to 4 explained in the above-described first embodiment.

In step S409, the reproduction control section 403 generates summary data which is a summary of the selected data based on the summary scheme selected by the user. At this time, the reproduction control section 403 makes sure that the total power consumption of the summary data is smaller than the current remaining power Pb of the battery 400. If the time taken to generate the summary is long, the remaining power of the battery 400 may reduce drastically. Thus, upon creating summary data the reproduction apparatus 40 according to this third embodiment re-detects the remaining power of the battery 400 at predetermined intervals and compares it with the total power consumption of the summary data.

After the reproduction of the summary data is started, operations such as fast rewind, fast forward and pause may reduce the remaining power of the battery 400 drastically, causing the battery 400 to be exhausted during the reproduction of the summary data. Therefore, the UI section 404 starts the reproduction of the summary and then disables operations other than stop (fast rewind, fast forward, pause, etc.) in step S410. This function prevents the reproduction of the summary data from being interrupted midway.

In step S411, the reproduction control section 403 starts to reproduce summary data. If video data is found in the summary data, the reproduction control section 403 processes it and supplies it to the display section 406 and if audio data is found in the summary data, the reproduction control section 403 processes it and supplies it to the speaker section 407.

As described above, the reproduction apparatus 40 according to the third embodiment can perform reproduction processing in consideration of the remaining power of the battery 400. Furthermore, when the remaining power of the battery 400 is not enough to reproduce the digital data selected by the user to the end, the reproduction apparatus 40 according to the third embodiment can warn the user of it.

Fourth Embodiment

Figure 6:
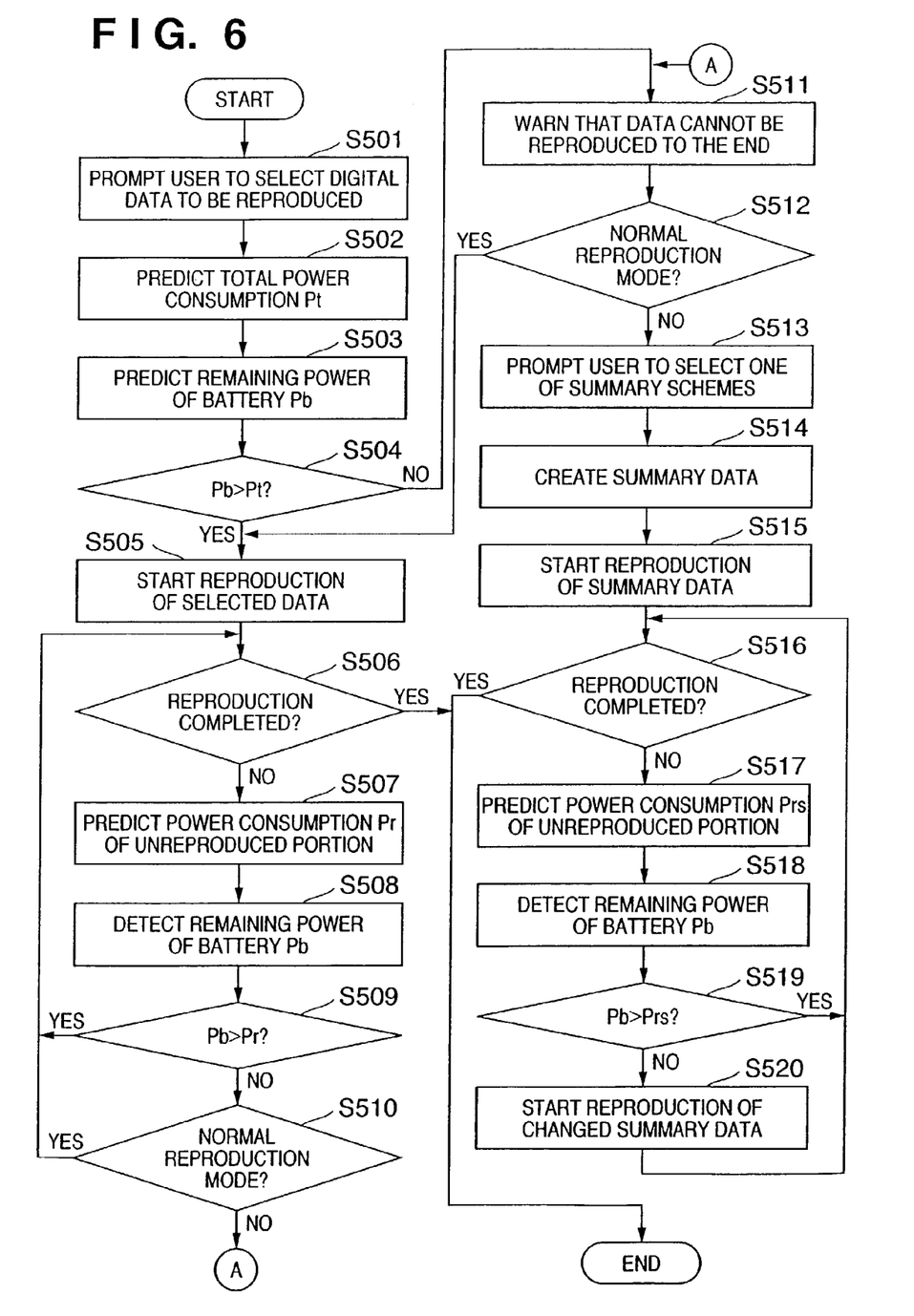
FIG. 6 is a flow chart showing a processing procedure of the reproduction apparatus according to the fourth embodiment of the present invention.

With reference to FIG. 4 and FIG. 6, the fourth embodiment of the present invention will be explained in detail below. The operation carried out by the prediction section 402 is the same as the operation explained in the above-described third embodiment.

With reference to the flow chart in FIG. 6, the processing procedure of the reproduction apparatus 40 according to the fourth embodiment will be explained.

In step S501, the UI section 404 prompts the user to select digital data to be reproduced.

In step S502, the reproduction control section 403 makes the prediction section 402 predict total power consumption Pt which is power consumption necessary to reproduce all digital data selected by the user (hereinafter referred to as "selected data"). The prediction section 402 predicts the total power consumption Pt of the selected data and notifies it to the reproduction control section 403.

In step S503, the reproduction control section 403 makes the detection section 401 detect the current remaining power of the battery 400. The detection section 401 detects the current remaining power Pb of the battery 400 and notifies it to the reproduction control section 403.

In step S504, the reproduction control section 403 decides whether the current remaining power Pb of the battery 400 is greater than the total power consumption Pt or not. This decision corresponds to a decision as to whether the selected data can be reproduced to the end or not.

If the current remaining power Pb of the battery 400 is greater than the total power consumption Pt (YES in step S504), the selected data can be reproduced to the end. In this case, the process moves on to step S505 and the reproduction control section 403 starts to reproduce the selected data without generating any summary of the selected data.

In step S506, the reproduction control section 403 decides whether the reproduction of the selected data is completed or not.

If the reproduction of the selected data is not completed (NO in step S506), in step S507, the reproduction control section 403 makes the prediction section 402 predict power consumption Pr of the unreproduced portion of the selected data. The prediction section 402 predicts the power consumption Pr of the unreproduced portion and notifies it to the reproduction control section 403.

In step S508, the reproduction control section 403 makes the detection section 401 re-detect the current remaining power Pb of the battery 400. The detection section 401 detects the current remaining power Pb of the battery 400 and notifies it to the reproduction control section 403.

In step S509, the reproduction control section 403 decides whether the current remaining power Pb of the battery 400 is greater than the power consumption Pr or not. This decision corresponds to a decision as to whether the selected data can be reproduced to the end or not. If the current remaining power Pb of the battery 400 is greater than the power consumption Pr (YES in step S509), the process moves back to step S506 and the reproduction control section 403 continues to reproduce the selected data.

If the current remaining power Pb of the battery 400 is not greater than the power consumption Pr (NO in step S509), the selected data cannot be reproduced to the end. In this case, the process moves on to step S510 and the reproduction control section 403 decides whether the normal reproduction mode is selected or not. If the normal reproduction mode is selected, the reproduction control section 403 continues to reproduce the selected data without creating any summary.

Furthermore, as a result of the decision in step S504, if the current remaining power Pb of the battery 400 is not greater than the power consumption Pt (NO in step S504) or if the normal reproduction mode is not selected in step S510, the battery 400 will be exhausted during reproduction of the selected data, and therefore the selected data will not be reproduced to the end. In this case, the process moves on to step S511 and the reproduction control section 403 displays a message or icon on the display section 406 indicating that the selected data cannot be reproduced to the end and warns the user of it. At this time, the reproduction control section 403 may also display the current remaining power Pb of the battery 400, power consumption Pt or Pr of the unreproduced portion and the difference thereof on the display section 406.

In step S512, the UI section 404 prompts the user to select a normal reproduction mode or summary reproduction mode. If the user selects the normal reproduction mode, the process in step S505 is executed. On the other hand, if the user selects the summary reproduction mode, the process in step S513 is executed.

If the summary reproduction mode is selected, the UI section 404 prompts the user to select one of summary schemes in step S513. In step S513, for example, the summary scheme can be selected from the summary systems 1 to 4 explained in the above-described first embodiment.

In step S514, the reproduction control section 403 generates summary data which is a summary of the selected data based on the summary scheme selected by the user. At this time, the reproduction control section 403 makes sure that the total power consumption of the summary data is smaller than the current remaining power Pb of the battery 400. If the time taken to generate the summary data is long, the remaining power of the battery 400 may reduce drastically. Thus, upon generating the summary data, the reproduction apparatus 40 according to the fourth embodiment re-detects the remaining power of the battery 400 at predetermined intervals and compares it with the total power consumption of the summary data.

In step S515, the reproduction control section 403 starts to reproduce the summary data. Unlike the reproduction apparatus 40 of the third embodiment, the reproduction apparatus 40 of the fourth embodiment does not restrict operations other than stop (fast rewind, fast forward, pause, etc.) after reproduction of the summary data is started. Thus, if these operations are carried out during reproduction, the remaining power of the battery may be not enough to reproduce all summary data. Operations in and after step S516 will be carried out to handle such a case.

In step S516, the reproduction control section 403 decides whether the reproduction of the summary data is completed or not.

If the reproduction of the summary data is not completed (NO in step S516), the process moves on to step S517 and the reproduction control section 403 makes the prediction section 402 predict power consumption Prs of the unreproduced portion of the summary data. The prediction section 402 predicts the power consumption Prs of the unreproduced portion and notifies it to the reproduction control section 403.

In step S518, the reproduction control section 403 makes the detection section 401 detect the current remaining power Pb of the battery 400. The detection section 401 detects the current remaining power Pb of the battery 400 and notifies it to the reproduction control section 403.

In step S519, the reproduction control section 403 decides whether the current remaining power Pb of the battery 400 is greater than the power consumption Prs or not. This decision corresponds to a decision as to whether the summary data can be reproduced to the end or not. If the current remaining power Pb of the battery 400 is greater than the power consumption Prs (YES in step S519), the process moves back to step S516 and the reproduction control section 403 continues to reproduce the summary data.

If the current remaining power Pb of the battery 400 is not greater than the power consumption Prs (NO in step S519), the summary data cannot be reproduced to the end. In this case, the process moves on to step S520 and the reproduction control section 403 changes the content of the summary data. Then, after changing the content of the summary data, the reproduction control section 403 starts to reproduce the changed summary data. If video data is found in the summary data, the reproduction control section 403 processes it and supplies it to the display section 406 and if audio data is found in the summary data, the reproduction control section 403 processes it and supplies it to the speaker section 407.

As described above, the reproduction apparatus 40 according to the fourth embodiment can perform reproduction processing in consideration of the remaining power of the battery 400. Furthermore, when the remaining power of the battery 400 is not enough to reproduce the digital data selected by the user to the end, the reproduction apparatus 40 according to the fourth embodiment can warn the user of it. In accordance with the reproduction apparatus 40 according to the fourth embodiment, there is no need to restrict operations such as fast rewind, fast forward, pause even in the summary reproduction mode.

Other Embodiment

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart shown in any one of FIGS. 2, 3, 5 and 6 described in the embodiments.

The present invention is not limited to the above embodiments and various changes and modifications can be made within the spirit and scope of the present invention. Therefore to apprise the public of the scope of the present invention, the following claims are made.

What is claimed is:

1. A reproduction apparatus comprising:
 a reproduction unit that reproduces digital data selected by a user;
 a detection unit that detects remaining power of a battery; and
 a determination unit that determines whether the selected digital data can be reproduced to the end or not based on the remaining power detected by the detection unit, before the reproduction unit starts reproducing the selected digital data,
 wherein if it is determined by the determination unit that the selected digital data can be reproduced to the end, the reproduction apparatus causes the reproduction unit to reproduce the selected digital data, and
 wherein if it is determined by the determination unit that the selected digital data cannot be reproduced to the end, the reproduction apparatus warns that the selected digital data cannot be reproduced to the end and causes the user to select one of first and second reproduction modes, if the first reproduction mode is selected by the user, the reproduction apparatus causes the reproduction unit to reproduce the selected digital data, and if the second reproduction mode is selected by the user, the reproduction apparatus causes the reproduction unit to reproduce summary data including a summary of the selected digital data.

2. The reproduction apparatus according to claim 1, wherein the determination unit determines, while the summary data is being reproduced, whether the summary data can be reproduced to the end or not based on the remaining power detected by the detection unit, and wherein if it is determined by the determination unit that the summary data cannot be reproduced to the end, the reproduction apparatus re-creates the summary data.

3. The reproduction apparatus according to claim 1, wherein if the second reproduction mode is selected by the user, the reproduction apparatus causes the user to select one of a plurality of summary methods and creates the summary data based on the summary method selected by the user.

4. A method for controlling a reproduction apparatus having a reproduction unit that reproduces digital data selected by a user, the method comprising the steps of:

detecting remaining power of a battery;

determining whether the selected digital data can be reproduced to the end or not based on the remaining power detected in the detecting step, before the reproduction unit starts reproducing the selected digital data;

if it is determined in the determining step that the selected digital data can be reproduced to the end, causing the reproduction unit to reproduce the selected digital data;

if it is determined in the determining step that the selected digital data cannot be reproduced to the end, warning that the selected digital data cannot be reproduced to the end;

if it is determined in the determining step that the selected digital data cannot be reproduced to the end, causing the user to select one of first and second reproduction modes;

if the first reproduction mode is selected by the user, causing the reproduction unit to reproduce the selected digital data; and if the second reproduction mode is selected by the user, causing the reproduction unit to reproduce summary data including a summary of the selected digital data.

5. The method according to claim 4, further comprising the steps of:

determining, while the summary data is being reproduced, whether the summary data can be reproduced to the end or not based on remaining power detected in the detecting step; and re-creating the summary data if it is determined in the determining step that the summary data cannot be reproduced to the end.

6. The method according to claim 4, further comprising the steps of:

causing the user to select one of a plurality of summary methods if the second reproduction mode is selected by the user; and creating the summary data based on the summary method selected by the user.

* * * * *

UNITED STATES PATENT AND TRADEMARK OFFICE
CERTIFICATE OF CORRECTION

| | |
|---|---|
| PATENT NO. | : 7,246,249 B2 |
| APPLICATION NO. | : 10/454206 |
| DATED | : July 17, 2007 |
| INVENTOR(S) | : Hirotaka Shiiyama |

Page 1 of 1

It is certified that error appears in the above-identified patent and that said Letters Patent is hereby corrected as shown below:

Title Page, item (54), delete " REPRODUCTION CONTROL OF REPRODUCTION APPARATUS BASED ON REMAINING POWER OF BATTERY " and insert -- APPARATUS TO CONTROL THE MODE OF THE REPRODUCTION OF DIGITAL DATA BASED ON THE REMAINING POWER OF THE BATTERY --

Column 1, lines 1-3, delete " REPRODUCTION CONTROL OF REPRODUCTION APPARATUS BASED ON REMAINING POWER OF BATTERY " and insert -- APPARATUS TO CONTROL THE MODE OF THE REPRODUCTION OF DIGITAL DATA BASED ON THE REMAINING POWER OF THE BATTERY --

Signed and Sealed this

Twenty-third Day of October, 2007

JON W. DUDAS
*Director of the United States Patent and Trademark Office*